United States Patent
Kuzminskiy et al.

(10) Patent No.: US 6,668,030 B2
(45) Date of Patent: Dec. 23, 2003

(54) RADIO COMMUNICATION SYSTEMS

(75) Inventors: Alexandr Kuzminskiy, Swindon (GB); Carlo Luschi, Oxford (GB); Paul Edward Strauch, Flyfield Nr. Lechlade (GB); Ran-Hong Yan, Farington (GB)

(73) Assignee: Lucent Technologies Inc., Murray Hill, NJ (US)

( * ) Notice: Subject to any disclaimer, the term of this patent is extended or adjusted under 35 U.S.C. 154(b) by 242 days.

(21) Appl. No.: 09/848,504

(22) Filed: May 3, 2001

(65) Prior Publication Data

US 2001/0050967 A1 Dec. 13, 2001

(30) Foreign Application Priority Data

May 5, 2000 (EP) ............................................ 00303807

(51) Int. Cl.[7] ............................ H04B 1/10; H03K 5/159
(52) U.S. Cl. ....................................... 375/350; 375/229
(58) Field of Search ................................ 375/347, 350, 375/229–234, 285, 346, 348

(56) References Cited

U.S. PATENT DOCUMENTS 5,566,209 A    10/1996   Forssen et al. .............. 375/262
6,385,254 B1 *  5/2002   Piirainen et al. ............ 375/262

FOREIGN PATENT DOCUMENTS

WO   WO 97/23061   6/1997   ............ H04B/7/005

OTHER PUBLICATIONS

Space–Time Processing For Wireless Communications, XP–000941658, IEEE Signal Processing 1053–5888/97, pp. 49–83.
European Search Report dated Dec. 21, 2000.

* cited by examiner

*Primary Examiner*—Tesfaldet Bocure

(57) ABSTRACT

A mobile telephone system includes a base station which establishes a link with a selected mobile station. The received signal from the mobile station will include a noise component as well as a possible interference component from another mobile station operating at the same frequency in another cell. The base station has a trellis based equalization system which operates on the assumption that the received signal includes components which have a predominantly Gaussian characteristic. A switch controller determines when the interference component (which is non-gaussian) in the received signal becomes a dominant component and operates to switch a spatio-temporal filter into the circuit instead of the trellis based equalization system, to improve the bit error rate performance.

11 Claims, 2 Drawing Sheets

RADIO COMMUNICATION SYSTEMS

CROSS-REFERENCE TO RELATED APPLICATION

This application claims priority of European Patent Application No. 00303807.2, which was filed on May 5, 2000.

FIELD OF THE INVENTION

The present invention relates to radio communication systems, in particular but not exclusively, to mobile radio communication systems.

BACKGROUND OF THE RELATED ART

Mobile radio communication systems involve an array of cells each served by a respective base station. Each base station communicates with various mobile stations located within its cell. Radio transmissions between a base station and a selected mobile station are subject to a variety of impairments. In time division multiple access (TDMA) cellular systems like GSM (global systems for mobile communications) or EDGE (enhanced data for GSM evolution), the received signal is distorted by the time varying multipath propagation channel which causes intersymbol interference. In addition, transmissions are impaired by thermal noise that results from both environmental noise and the noise generated by the circuitry of the receiver. Mobile station and base station radio receivers operate on one or more noisy and distorted waveforms as obtained by one or more receiver antennas. In order to extract the original transmitted data from the received waveforms, TDMA receivers employ equalisation systems which try to compensate for signal distortion and additive disturbances. Such equalisers operate on the basis that each signal burst includes a unique set of training symbols. Traditionally, TDMA cellular receivers employ trellis based receivers for one or more received signals. By using known training symbols transmitted within each burst, the trellis processor of the equalisation system is able to detect the transmitted payload from the noisy and distorted received signals. Conventionally, trellis equalisers operate on a maximum likelihood (ML) (see G D Forney Jr, "Maximum likelihood sequence estimation of digital sequences in the presence of intersymbol interference", IEEE Trans Inform Theory, vol IT-18, no 3, pp 363–378 May 1972) or a maximum a posterion probability (MAP) (see L R Bahl, J Cocke, F
Jelinek and J Raviv, "Optimal decoding of linear codes for maximising symbol error rate", IEEE Trans Inform Theory, Vol IT-20, pp 284–287, March 1974) criteria and operate optimally based on the assumption that the noise has a Gaussian distribution.

An additional problem arises in the presence of co-channel interference (CCI). To increase spectral efficiency, cellular radio systems usually employ frequency reuse. While the base stations of immediately adjacent cells operate at different frequencies, the number of frequencies available is limited and so some cells further away operate at the same frequency. As the cells become smaller they become closer together and so interference between cells increases, ie a base or mobile station in one cell receives not only a signal of frequency f from the mobile or base station with which a link has been established, but also an interference signal of frequency f from a mobile or base station in another cell operating at that same frequency. Because such interference signals are not Gaussian, the trellis based equalisation system requires a proper spatio-temporal model of the CCI. If, as is so often the case, the disturbance cannot be accurately modelled or the estimated, the trellis based equaliser becomes sub-optimum and experiences a significant performance degradation. Even when a suitable model for the CCI can be developed, the resulting receiver is often too complex to be efficiently implemented. In an interference limited scenario, spatio-temporal filtering techniques (see A M Kuzminskiy, C Luschi and P Strauch, "Comparison of linear and MISE spatio-temporal interference rejection combing with an antenna array in a GSM system" in Proc VTC 2000, Tokyo, Japan, May 2000) provide superior performance especially for multiple antenna receivers. However, such techniques perform poorly in noise limited scenarios.

Receivers for implementing a space-time filtering stage followed by a trellis processor have been proposed (see A J Paulraj and C B Papadias "Space-time processing for wireless communication" IEEE Signal Proc Mag, pp 40–84, November 1997). However, particularly in a software implementation of such an equaliser, this strategy will result in a significant increase in implementation complexity.

It is an object of the present invention to provide an improved radio communication system which is able to deal with both noise and interference disturbances in a more efficient and less costly manner.

SUMMARY OF THE INVENTION

According to the present invention there is provided a cellular radio communication system comprising a plurality of cells each having a base station serving a plurality of mobile stations, at least one of said stations having a receiver for receiving a data signal and any accompanying noise propagated from the station with which a link has been established, and an interference signal propagated from a station in another cell, said at least one station having a trellis based equalisation system operative in a sense to detect transmitted data symbols from the accompanying disturbances in the distorted received signal, a spatio-temporal filter operative to process the received signal in a sense to minimise the signal distortion and the associated disturbances, and a switch responsive to predetermined criteria related to the value of the power of the noise signal relative to the value of the power of interference signal in the received signal to switch the received signal from the trellis based equalisation system to the spatio-temporal filter and vice versa.

BRIEF DESCRIPTION OF THE DRAWINGS

A cellular radio communication systems embodying the present invention, will now be described, by way of example, with reference to the accompanying diagrammatic drawings, in which.

DETAILED DESCRIPTION

Figure 1:
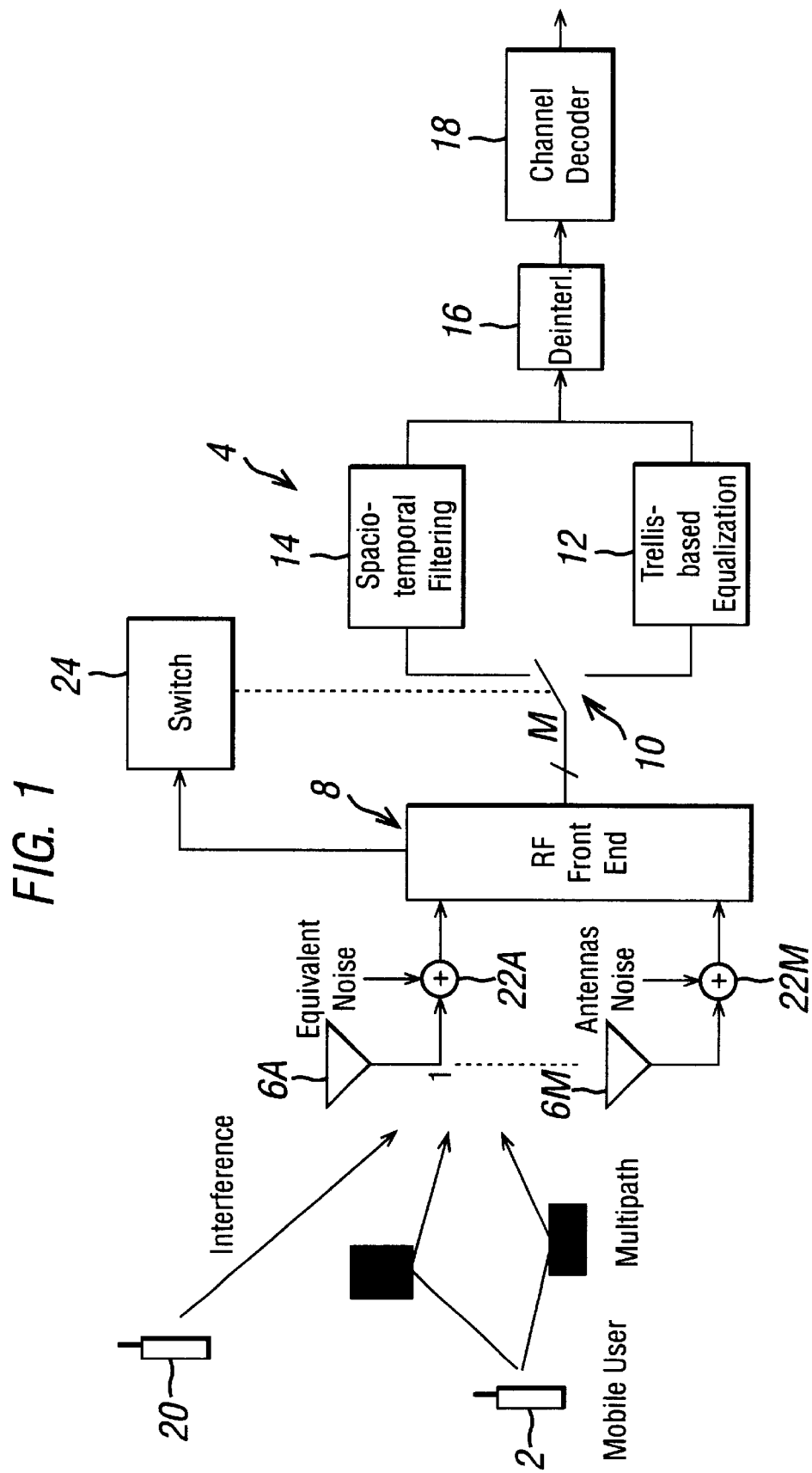
FIG. 1 is a block diagram of the cellular radio communication system.

The mobile radio communication system shown in FIG. 1 includes a mobile station 2 communicating with the base station 4 of the cell in which the mobile station 2 is located. The base station 4 includes a plurality of independent differently sited antenna 6A to 6M (only two of the M antennas being shown namely 6A and 6M). Each antenna 6A to 6M feeds into the front end of its own receiver, shown collectively as receiver front end 8.

The output of each front end is fed via a respective switch 10 either to a respective trellis based equalisation system 12 or a respective spatio-temporal filter 14. The outputs of the spatio-temporal filters 14 are combined and fed to a deinterlever 16 and the outputs of the trellis based equalisation systems 12 are combined and fed to the same deinterlever 16. The output of deinterlever 16 is fed to a channel decoder for decoding the information data.

In operation, the mobile station 2 will transmit a data signal 2 to the base station 4. The signal received by the base station will be the data signal accompanied by noise due to environmental conditions, reflections of the data signal due to the surrounding topography and interference from another mobile user 20 operating at the same frequency but in a remote cell. Added to this will be noise generated on the receiver itself resulting in the total equivalent noise indicated by way of a respective summing circuit 22A to 22M located between each antenna 6A to 6M and the front end 8 of the receiver.

The trellis based equalisation system, which may be a Viterbi ML or MAP equalisation, operates on the assumption that the total additive disturbance accompanying the data signal ie thermal noise, plus CCI have a Gaussian distribution. When the switch 10 is switched to the trellis based equalisation system 12, the system operates to provide optimum data detection in a typical noise limited scenario.

Interference from another mobile station however does not have a Gaussian distribution and so when the interference reaches a particular level, the performance of the trellis based equalisation system starts to degrade. It is at this point that the switch 10 is switched to the spatio-temporal filter 14 which implements a linear or decision feedback filtering aimed at minimising a suitable cost function at its output (eg a least squares "LS" cost). In an interference limited scenario, this processing produces a lower bit error rate than could be achieved by the trellis based equalisation system.

In the case of the spatio-temporal filter 14, the filter acts to selectively weight the incoming signal at different points in time in a sense to minimise the effect of the interference on the training symbols and therefore on the payload within the data signal.

The switches 10 are operated by a switch controller 24 which monitors the received signals and operates the switches 10 in response to predetermined conditions existing in the received signals. The switching criteria is based on a determination of the relationship between the estimated power level of interference $P_I$ and the estimated power level of noise $P_N$ in the received signal consisting of the data signals, the noise signal N and interference signal I.

Figure 2:
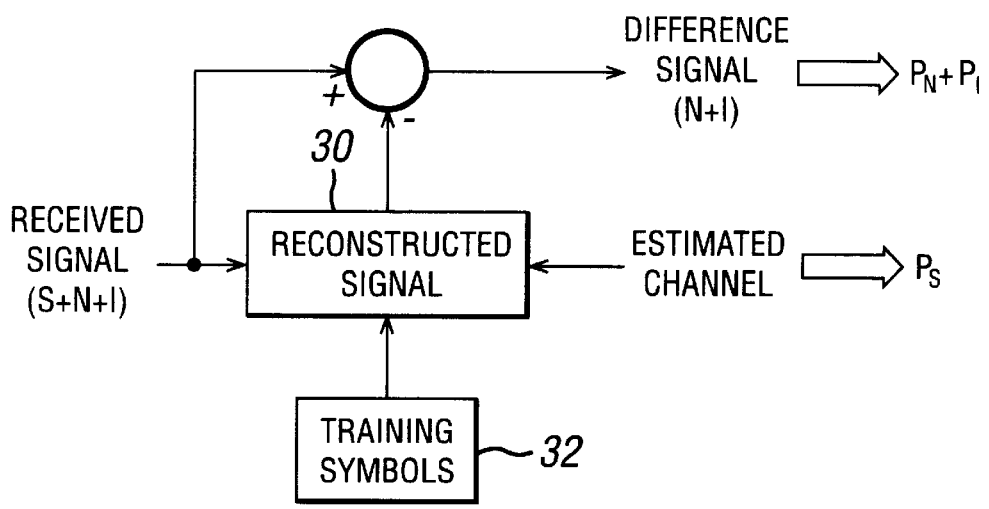
FIG. 2 is a block diagram of part of the switch circuit of FIG. 1.

An example of a possible realisation of the switch controller 24 is shown in FIG. 2. A processor 30 receives training symbols from a store 32 and the received signal (S+N+I) to reconstruct the original data signal S. A difference unit 34 receives the received signal (S+N+I) and subtracts from it the reconstructed original signal from the processor 30 to produce a difference signal consisting (N+I) of noise (N) and interference (I) only.

Noise and interference power $P_N$ and $P_I$ can thus be determined as well as the overall power Ps of the received signal.

Because the average noise power $P_N$ is a receiver design parameter and remains generally constant and while the interference power will vary from burst to burst, it is possible to determine the values of $P_N$ and $P_I$ by relying on a knowledge of the thermal noise floor.

Given two pre-selected constants "$h_1$" and "$h_2$" which are pre-stored in a look-up-table based on a function of the estimated signal to noise ratio (SNR) or the estimated signal to interference ratio (SIR) the switching criteria under which the switch controller 34 operates is as follows.

If the estimated SNR is greater than SIR plus $h_1$ dB, the switches 10 are switched to the spatio-temporal filter 14.

If the estimated SNR is less than SIR plus $h_2$ dB, then the switches 10 are switched to the trellis based equalisation system 12. The constants h1 and h2 may be fixed or a function of the estimated SNR or SIR. It will be understood that the rate can also be implemented in terms of $P_N$ and P1 without needing to compute the quantities SNR=$P_s/P_N$ and SIR=$P_s/P_I$.

Figure 3:
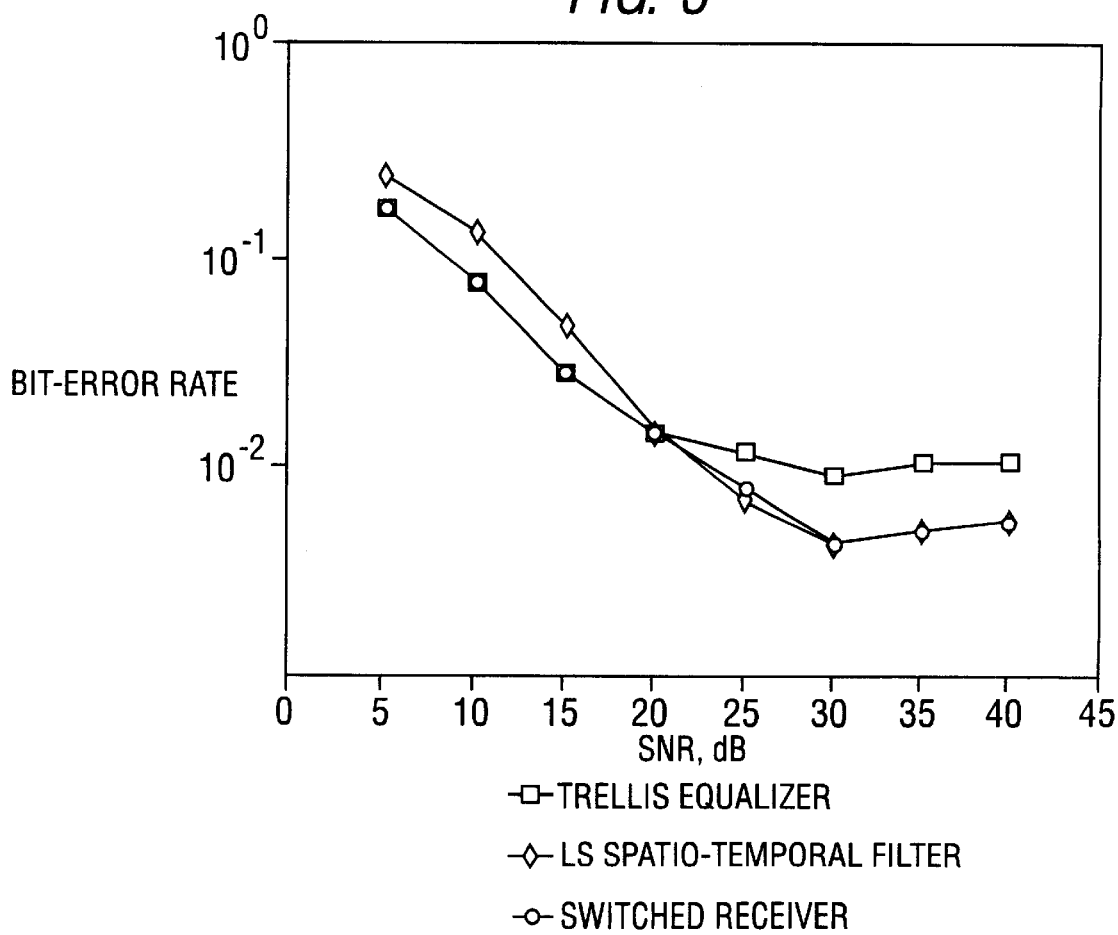
FIG. 3 is a graph of bit error rate versus signal to noise ratio for the equaliser and spatio-temporal filter of FIG. 1.

In order to test the effectiveness of the algorithm, a simulation was conducted using the values h1=h2=5 dB. The simulation was conducted using an EDGE (enhanced data for GSM evolution) receiver with two antennas. The interference was asynchronous with an SIR of 15 dB. It was assumed that a typical urban propagation channel was used at a speed of 3 KM/h. The bit-error rate was plotted against SNR for the trellis equalisation system 12, for the spatio-temporal filter 14 and for the switched receiver. The results are shown in FIG. 3 from which the benefits of the present invention can be appreciated.

While the base station has been described as having spatio-temporal filter, a trellis based equalisation system and a switch for switching between them, it will be appreciated that the same components can be incorporated into the mobile station instead or as well. Also, while the base station has been described as having an array of antenna, it may have only a single antenna. While the mobile station has been described as having only a single antenna, it may have multiple antennas. While the use of multiple antennas generally increases the amount of circuitry used, the beneficial effects are that by combining the outputs of the different antenna, the data signal can be reinforced while the noise and interference signals can be combined in a manner to be self cancelling.

Changes may be made in the combination and arrangement of the elements as herein before set forth in the specification and shown in the drawings, it being understood that changes may be made in the embodiment disclosed without departing from the spirit and scope of the invention and defined in the following claims.

What is claimed is:

1. A cellular radio communication system comprising a plurality of cells each having a base station serving a plurality of mobile stations, at least one of said stations having a receiver for receiving a data signal and any accompanying noise propagated from the station with which a link has been established, and an interference signal propagated from a station in another cell, said at least one station having a trellis based equalisation system operative in a sense to detect transmitted data symbols from the accompanying disturbances in the distorted received signal, a spatio-temporal filter operative to process the received signal in a sense to minimise the signal distortion and the associated disturbances, and a switch responsive to predetermined criteria related to the value of the power of the noise signal relative to the value of the power of interference signal in the received signal to switch the received signal from the trellis based equalisation system to the spatio-temporal filter and vice versa.

2. A system according to claim 1, wherein said at least one station comprises the base station.

3. A system according to claim 1, wherein said at least one station includes an array of antennas and the receiver associated with said antennas operates in a manner to minimise the signal distortion and the effect of noise and interference signals.

4. A system according to any one of claims 1 to 3, wherein said trellis based equalisation system operates on the basis that the data signal component of the received signals is impaired by intersymbol interference and additive Gaussian disturbances.

5. A system according to any one of claims 1 to 3, wherein the predetermined criteria is the point at which the estimated signal to noise ratio in the received signal exceeds the estimated signal to interference ratio in the received signal by a predetermined amount.

6. A system according to claim 5, wherein the predetermined amount is a function of signal to noise ratio SNR or signal to interference ratio SIR.

7. A system according to claim 5, wherein the predetermined amount is $h_1$ dB when the estimated SNR is greater than the estimated SIR and $h_2$ dB when the estimated SNR is less than the estimated SIR and wherein $h_1$ and $h_2$ are variable constants.

8. A system according to claim 7, wherein $h_1 = h_2$.

9. A system according to any one of claims 1 to 3, wherein said at least one station includes a processor for estimating the power of the sum of the said noise and interference signals.

10. A system according to any one of claims 1 to 3, wherein said at least one station includes a store for storing a unique set of training symbols, a processor for receiving the training symbols from the store and comparing them with training symbols in the received signal to reconstruct the data signal therefrom, and difference means for subtracting the reconstructed data signal from the received signal to provide a combined noise and interference signal from which the power of the noise relative to the power of the interference can be determined.

11. A radio communication system comprising a first radio station and a second radio station, at least one of said stations having a receiver for receiving a data signal and any accompanying noise propagated from the second station, and an interference signal propagated from another station, said at least one of said first and second stations having a trellis based equalisation system operative in a sense to detect transmitted data symbols from the accompanying disturbances in the distorted received signal, a spatio-temporal filter operative to process the received signal in a sense to minimise the signal distortion and the associated disturbances, and a switch responsive to predetermined criteria related to the value of the power of the noise signal relative to the value of the power of interference signal in the received signal to switch the received signal from the trellis based equalisation system to the spatio-temporal filter and vice versa.

* * * * *